United States Patent [19]

Baermann

[11] 4,186,609

[45] Feb. 5, 1980

[54] EDDY-CURRENT DEVICE FOR MEASURING ROTATIONAL SPEED

[76] Inventor: Max Baermann, Bensberg-Wulfshof, Postfach 26, 5060 Bergisch Gladbach 1, Fed. Rep. of Germany

[21] Appl. No.: 881,779

[22] Filed: Feb. 27, 1978

[30] Foreign Application Priority Data

Mar. 4, 1977 [DE] Fed. Rep. of Germany ....... 2709412

[51] Int. Cl.$^2$ ............................................. G01P 3/49
[52] U.S. Cl. ...................................... 73/497; 73/519; 73/520
[58] Field of Search ......................... 73/519, 520, 497; 335/303, 306; 310/105, 106

[56] References Cited

U.S. PATENT DOCUMENTS

| 647,791 | 4/1900 | Armor | 73/519 |
|---|---|---|---|
| 806,363 | 12/1905 | Porter et al. | 73/519 |
| 1,166,765 | 1/1916 | Kaminski | 310/105 |
| 1,903,832 | 4/1933 | Nichols | 73/519 X |
| 2,668,944 | 2/1954 | Schwyn | 73/497 X |
| 2,725,493 | 11/1955 | Mitchel et al. | 73/519 |
| 3,024,392 | 3/1962 | Baermann | 335/303 |
| 3,257,586 | 6/1966 | Steingroever | 335/303 |
| 3,452,606 | 7/1969 | Powell | 73/519 |

FOREIGN PATENT DOCUMENTS 1063412  8/1959  Fed. Rep. of Germany ............. 73/519

72982  3/1916  Switzerland ............................. 73/520

Primary Examiner—S. Clement Swisher
Assistant Examiner—Denis E. Corr
Attorney, Agent, or Firm—Meyer, Tilberry & Body

[57] ABSTRACT

An eddy-current speedometer having a rotatably driven permanent magnetic element and a cooperating eddy-current rotary element provided with an indicating device and mounted to rotate coaxially therewith and be set rotating by alternating magnetic fields generated by the magnetic element at spaced points therearound and penetrating the rotary element in directions radially thereof, has its magnetic element made of a magnetic material of low permeability and provided with at least eight sets of magnetic poles of alternating polarity equally spaced apart in a concentric path around the rotatable magnetic element with the poles of each set being of opposite polarity and spaced apart radially of the rotatable magnetic element to define an air gap therebetween. The rotatable magnetic element is provided with a temperature compensating element in the form of a ring member concentric with and overlying corresponding ones of the poles of the concentrically arranged magnetic pole sets to compensate for changes in the magnetic flux developed by the permanent magnetic member, and changes in the electrical conductivity of the rotary element, which result from ambient temperature fluctuations.

11 Claims, 4 Drawing Figures

EDDY-CURRENT DEVICE FOR MEASURING ROTATIONAL SPEED

BACKGROUND OF THE INVENTION

This invention relates to an eddy-current speedometer with temperature compensation and comprising a rotating permanent magnetic element made from a magnet material with low permeability, and an eddy-current rotary element provided with an indicating device and made from an electrically conductive material. By means of the alternating magnetic field which is created by the permanent magnetic element and which is carried through a circular path when the magnetic element is rotated, the eddy-current rotary element is in turn set rotating through a given angular degree which is translated by the indicating device into a reading of the rotational speed of the magnetic element.

The permanent magnet materials with low permeability such as barium ferrite, strontium ferrite or lead ferrite have a relatively low energy product and a relatively low remanence. When such magnetic materials are employed for the permanent magnetic element in eddy-current speedometers, the usual magnetization in axial or radial direction relative to the axis of rotation of the rotating permanent magnetic element of the speedometer produces a relatively low torque in the eddy-current rotary element. Also, these materials are substantially dependent on temperature. This advantage has been the main reason for the use of these materials for eddy-current speedometers only to a limited extent. As generally known, the electrical conductivity of the material from which the eddy-current rotary element is customarily made also changes according to ambient temperature fluctuations. Consequently, it has been found necessary to compensate for these changes in the magnetic flux and these conductivity fluctuations due to variations in temperature.

In accordance with the invention, the temperature compensation has been achieved by incorporating in the magnetic element a temperature compensating material having a permeability dependent upon temperature. This material is formed into a ring or disc and is positioned on the magnetic element in a way that results in part of the magnetic flux being short-circuited. When the temperature increases, the permeability of the temperature compensating material decreases in order to keep the effective flux in the active air gap constant. This material can also compensate for reductions in the electrical conductivity of the eddy-current rotary element.

By employing these temperature compensating elements, the already relatively small effective field gradient of the aforementioned magnetic materials is reduced further. In addition, it is somewhat difficult to achieve an optimum temperature compensation of the ferrite type magnetic materials within a temperature range in the order of $-20°$ C. to $+80°$ C. because this magnet material has a very low magnetic conductivity or permeability which is approximately the magnetic conductivity of air.

The known eddy-current speedometers have always been provided with a magnet which is arranged within the eddy-current rotary element. To provide for a return path for the magnetic lines of flux, there has been usually provided in addition a ferromagnetic element around the eddy-current rotary element. This ferromagnetic element is either stationary or rotates with the central magnet fastened to the drive shaft of the speedometer. With these prior assemblies, which are characterized by relatively high manufacturing costs, the driving torque produced by the eddy-current rotary element has not been satisfactory. Contrary to the methods usually applied heretofore by those skilled in the art, the present invention is substantially different from common practice in this field.

SUMMARY OF THE INVENTION

It is an object of the present invention to provide a magnetic circuit for an eddy-current speedometer, which does not require a considerable amount of magnet material and temperature compensating material, but nevertheless guarantees a maximum induction in the effective air gap and consequently a high driving torque though using permanent magnet materials of relatively low permeability for the rotating magnetic element of the speedometer.

In accordance with the invention, the above stated object is achieved by having the eddy-current rotary element of the speedometer faced by parts of the rotating permanent magnetic element which, on its surface or surfaces facing the eddy-current rotary element, is provided with at least eight poles of alternating polarity, so that the magnetic lines of flux, emanating from the poles, penetrate the air gap and the eddy-current rotary element, and by further providing at least one surface of the permanent magnetic element with a thin temperature compensating element. With this assembly made in accordance with the present invention, all the magnetic lines of flux emanating from the poles are utilized for the production of eddy-currents in the eddy-current rotary element, without the presence of any leakage losses. This, in turn, allows the use of permanent magnet materials having considerably lower remanence or remanent induction than the Alnico permanent magnets customarily employed heretofore. However, these lower remanence permanent magnet materials, such as barium ferrite, strontium ferrite or lead ferrite, have a relatively high temperature error.

It is somewhat difficult to achieve an optimum compensation of the temperature error inherent in the above mentioned ferrite type materials within the required temperature range of about $-20°$ C. to $+80°$ C. because these materials have a very low permeability which is approximately equal to the permeability of air. By providing the magnetic element with the multipolar magnetization of alternating polarity according to the present invention, however, the temperature compensating element can be formed as a thin tape which is arranged in a step-like shoulder or groove in the surface of the permanent magnetic element facing the air gap. Despite this small amount of temperature compensating material, an optimum temperature compensation is achieved nevertheless.

In a preferred embodiment of the invention, the rotating permanent magnetic element is in the form of a ring having a U-shaped cross-section with the opening thereof facing axially of the ring. The legs of the U-shaped permanent magnetic element are provided with alternating magnetic poles, and the opposed annular surfaces of these legs are arranged opposite a cylindrical wall of the eddy-current rotary element, the wall projecting into the annular space or air gap formed by these opposed annular surfaces. The annular permanent magnetic element is secured to the drive shaft by means of a separate fastening or mounting member.

In a further preferred embodiment according to the invention, the rotating permanent magnetic element or ring with the U-shaped cross-section is provided with a fastening or mounting member which is molded-on as the rotating permanent magnetic element is being manufactured. This fastening member is provided with a central bore in which the drive shaft engages, for example with a press fit, or the fastening member engages in a sleeve arranged on the shaft. The rotating permanent magnetic element may also be composed of two permanent magnet rings which are arranged concentrically to each other, one within the other in spaced relation. The circumferential surfaces of these rings, which are provided with magnetic poles of alternating polarity, are located opposite each other in spaced relation to define an annular air gap therebetween. The permanent magnet rings are mounted on a separate fastening or mounting member within a peripheral portion thereof having a U-shaped cross-section. The fastening member is firmly secured to the drive shaft.

The permanent magnetic element can also be formed as a disc, and the surface of the disc, having a magnetization of several poles with alternating polarity arranged in a circular pattern therearound, can be arranged opposite a disc-shaped eddy-current rotary element. Furthermore, a disc of soft iron serving as a flux return path can be arranged in such a way that the eddy-current rotary element is positioned between the surface of this disc and the magnetized surface of the permanent magnetic element. The torque developed in the eddy-current rotary element is also increased by this particular arrangement.

The invention itself and its objects and advantages will become apparent from the following description illustrating preferred embodiments of the invention, when read in connection with the accompanying drawings.

DESCRIPTION OF THE PREFERRED EMBODIMENTS

Figure 1:
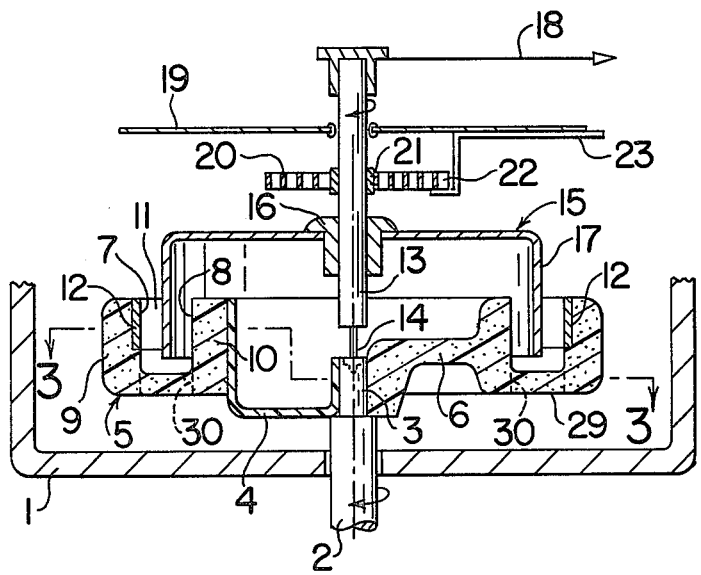
FIG. 1 is a longitudinal axial section through an eddy-current speedometer comprising the invention, with the left half of the drawing illustrating the annular permanent magnetic element with U-shaped cross-section according to one form of the invention, and the right half of the drawing showing the permanent magnetic element with U-shaped cross-section provided with a molded on fastening member firmly joined to the drive shaft in accordance with another form of the invention.

Referring to FIG. 1, the eddy-current speedometer or rotational speed measuring device comprising the invention is surrounded by a housing 1 which is only partially shown and is formed, for example, from plastic or metal. A drive shaft 2, which is rotated in the direction indicated by the arrow at a speed corresponding to the speed of the vehicle or other rotating mechanism, projects through the housing 1. As illustrated in the left half of the sectional drawing of FIG. 1, a fastening or mounting member 4, which is of generally cylindrical cup-shaped cross-section, is secured to the upper stepped end 3 of the drive shaft. The fastening member 4 may be made from paramagnetic or diamagnetic material as, for instance, a suitable plastic. A rotating permanent magnetic element 5, which is formed as a ring with an axially facing U-shaped cross-section, is secured to the outer circumference of the fastening member 4.

The right half of the sectional drawing of FIG. 1 illustrates another embodiment of the permanent magnetic element 5. In this modified arrangement, the rotating permanent magnetic element or ring 5 of U-shaped cross-section is additionally provided with a molded-on fastening member 6 which is made from the same plastic-bound permanent magnet material as the U-shaped permanent magnetic element or ring 5 and is secured to the upper stepped end 3 of the drive shaft 2.

Figure 3:
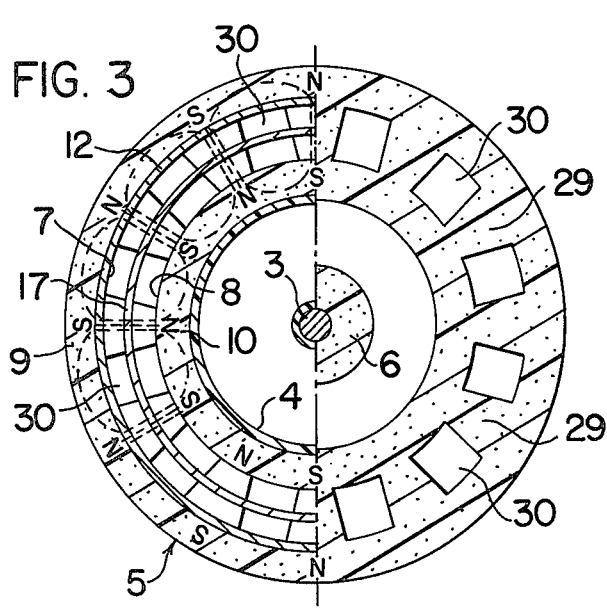
FIG. 3 is a transverse section taken along the line 3—3 of FIG. 1 and illustrating the magnetic poles of the annular elements of the cylindrical magnet which are opposite to each other with the annular gap therebetween.

The annular surfaces 7, 8 of the legs 9, 10 of the permanent magnetic element 5, which define the annular air gap 11, are each provided with at least eight magnetic poles of alternating polarity. In FIG. 3 the poles are indicated by the letters N and S denoting their north or south pole polarity. As can be seen from this Figure, poles of opposite polarity are located opposite each other, in a circularly arranged pattern of coacting pole sets, so that the magnetic lines of flux emanating from the poles penetrate or traverse the effective air gap 11 in directions radially of the magnetic element 5. As also shown in FIG. 3, the intermediate wall or web portion 29 joining the legs 9, 10 of the U-shaped permanent magnetic element 5 is provided with recesses or apertures 30 in which the legs of the preferably meander-shaped magnetizing device engage during the magnetization of the member 5.

In accordance with the invention, a tape-shaped temperature compensating element or ring 12 is positioned on one or the other of the opposed cylindrical surfaces 7, 8 of the magnetic element 5, preferably on the outermost one 7 of these surfaces and arranged in and suitably secured within an annular recess or shoulder in the surface 7, e.g., as by means of adhesives. The tape-shaped temperature compensating element or ring 12 may be formed of a material consisting preferably of iron-nickel alloys with about 30 percent by weight of nickel, and the tape thickness thereof is less than about 0.6 mm and preferably in the range of 0.2 to 0.3 mm.

A pointer rotation axle 13 is arranged above or opposite the end of the drive shaft 2 in axial alignment therewith and mounted in a pivot bearing 14 therein so as to be freely rotatable. A bell-shaped eddy-current rotary element 15, which may be made of an electrically conductive material such as aluminum for example, is secured to the pointer rotation axle 13 by means of a fastening sleeve 16. The eddy-current rotary element 15 is provided with a cylindrical wall 17 which is coaxial with the rotating permanent magnet element 5 and projects into the air gap 11 formed by the legs 9 and 10 of the element 5. Fastened on the rotation axle 13 in known manner is a pointer 18 which moves across the dial member 19. The rotation axle 13 is surrounded by a spiral spring 20 the inner end 21 of which is fastened to the rotation axle and the outer end 22 of which is fastened to a stationary member 23 of the housing 1.

Figure 2:
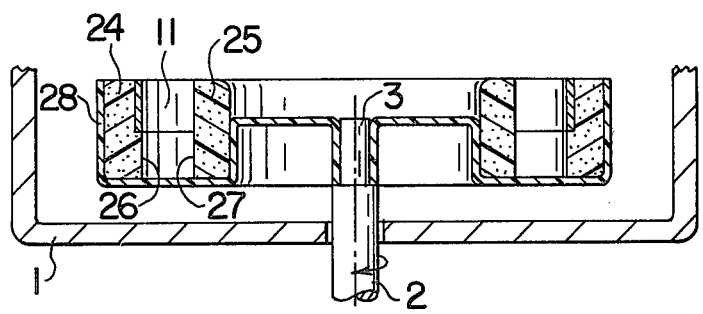
FIG. 2 is a longitudinal axial section, only partially shown, through another form of eddy-current speedometer according to the invention, having its magnetic element composed of two permanent magnet rings arranged concentrically one within the other and secured to a fastening member which is joined to the drive shaft.

FIG. 2 illustrates another advantageous embodiment of the permanent magnetic element 5. For the purpose of better clearness, this Figure only illustrates the drive shaft 2 with the rotating permanent magnetic element thereon. The drive shaft is mounted in bearings in the housing 1. This permanent magnetic element 5 in FIG. 2 is composed of two permanent magnetic rings 24, 25 which are arranged concentrically to each other in spaced relation one within the other. The opposing cylindrical surfaces 26, 27 of these permanent magnetic rings are provided with magnetic poles of alternating polarity in the same manner as shown in FIG. 3, and they define the air gap 11. The cylindrical wall 17 of the eddy-current rotary element (not shown) projects into this air gap, the same as in FIG. 1. The two permanent magnetic rings 24, 25 are mounted in a fastening or mounting member 28 corresponding to member 4 in FIG. 1 and secured to the stepped end 3 of the drive shaft 2. As shown, the member 28 is formed with an annular portion of U-shaped cross-section within which the rings 24, 25 are mounted.

Figure 4:
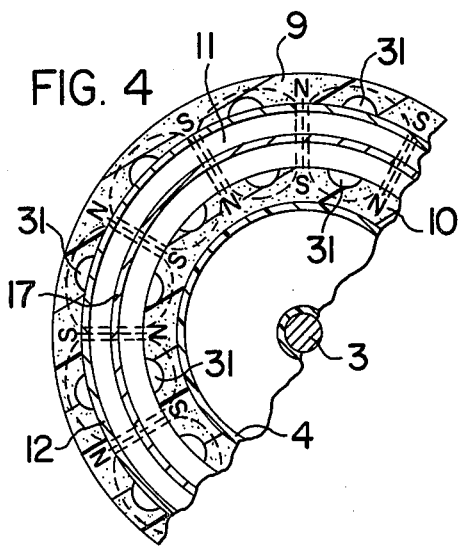
FIG. 4 is a transverse section, only partially shown, through still another form of eddy-current speedometer according to the invention, illustrating the annular surfaces of the permanent magnet which define the air gap and are provided with groove-shaped recesses between their magnetic poles.

To avoid any flux leakage between the adjacent magnetic poles of opposite polarity of each permanent magnetic ring 24 and 25 in FIG. 2, or of each leg 9, 10 of the permanent magnetic element in FIG. 1, groove-shaped recesses 31 are provided, in an advantageous embodiment, between the magnetic poles on the annular surfaces 26, 27 or 7, 8 facing the air gap 11, as illustrated in FIG. 4.

The permanent magnetic element 5 is made from a mixture of a particulate permanent magnet material, preferably powdered anisotropic barium ferrite, strontium ferrite or lead ferrite, with a plastic binder, which mixture can be injection-molded or compression-molded. While under the influence of a magnetic aligning field, this mixture of anisotropic magnetic material and binder is formed into a molded body 5 by conventional injection molding or compression molding. Consequently, element 5 is a bonded permanent magnet element which is preferably anisotropic.

When the permanent magnetic element 5 is rotated by the drive shaft 2, the eddy-current rotary element 15, the cylindrical wall 17 of which projects into the annular air gap 11 and is penetrated by the magnetic lines of flux extending in radial direction, is driven due to the production of eddy-currents in the eddy-current rotary element 15, and thereby rotated in the direction indicated by the arrow against the force of the spiral spring 20, with the deflection of the speed indicating pointer 18 increasing in dependence on the increase in the rotational speed of the drive shaft 2.

The invention is not restricted to the embodiments described in the foregoing. Thus, on its outside surfaces facing away from the air gap 11, the permanent magnetic element 5 can, for example, be provided with a soft-iron ring serving as a flux return path. Also, the permanent magnetic element 5 can be composed instead of disc-shaped members. According to the invention, however, it is the most important feature that the eddy-current rotary element 15 is surrounded by magnetized members 9, 10 or 24, 25 of the rotating permanent magnetic element 5.

Having thus defined the invention, it is claimed:

1. An eddy-current device for measuring the rotational speed of a rotating drive shaft comprising, annular permanent magnet element means concentric with and mounted on said shaft for rotation therewith, said element means including concentric radially spaced outer and inner ring portions of molded powdered permanent magnetic material bonded by a plastic binder, means mounting said ring portions on said shaft in radially spaced relationship with respect thereto and with respect to one another, said ring portions providing radially spaced circumferentially continuous and uninterrupted outer and inner cylindrical surfaces concentric with said shaft, said outer and inner surfaces providing a circumferentially continuous and uninterrupted axially open air gap concentric with said shaft, said outer cylindrical surface including a first plurality of magnetic poles of alternating polarity equally spaced completely about the circumference of said outer surface, said inner cylindrical surface including a second plurality of magnetic poles of alternating polarity equally spaced completely about the circumference of said inner surface, said first and second pluralities being of like number and providing at least eight sets of radially opposed poles of opposite polarity completely about said circumferentially continuous air gap to provide alternating magnetic fields emanating from said pole sets with their magnetic flux lines traversing said air gap in directions radially of said drive shaft, a thin temperature compensating element on one of said outer and inner cylindrical surfaces of said magnet element means, and an eddy current rotary element of electrically conductive non-magnetic material mounted for rotation relative to said drive shaft, said eddy current element including a circumferentially continuous cylindrical wall coaxial with said drive shaft and projecting axially into said air gap between said outer and inner cylindrical surfaces of said magnet element means to circumferentially continuously intersect said alternating magnetic fields traversing said air gap.

2. A measuring device as specified in claim 1, wherein said temperature compensating element comprises a thin cylindrical ring of an iron-nickel alloy containing about thirty percent by weight of nickel. magnetic material in a plastic binder.

3. A measuring device as specified in claim 2, wherein said magnetic material is selected from the group consisting of the ferrites of barium, strontium.

4. A measuring device as specified in claim 1, wherein said ring portions and said means mounting said ring portions on said shaft comprises a molded unitary body of said powdered magnetic material, said magnetic material being selected from the group consisting of the ferrites of barium, strontium and lead.

5. A measuring device as specified in claim 1, wherein said means securing said ring portions to said drive shaft is a mounting member separate from said ring portions.

6. A measuring device as specified in claim 5, wherein said mounting member is composed of a paramagnetic material.

7. A measuring device as specified in claim 5, wherein said mounting member is composed of a diamagnetic material.

8. A measuring device as specified in claim 1, wherein said temperature compensating element is a cylindrical ring having a radial thickness of less than about 0.6 mm.

9. An eddy-current device for measuring the rotational speed of a rotating drive shaft comprising, annular permanent magnet element means concentric with and mounted on said shaft for rotation therewith, said element means being formed of low permeability magnet material and including radially spaced circumferentially continuous outer and inner cylindrical surfaces concentric with said shaft, said outer and inner surfaces providing a circumferentially continuous axially open air gap concentric with said shaft, said outer cylindrical surface including a first plurality of magnetic poles of alternating polarity equally spaced completely about the circumference of said outer surface, said inner cylindrical surface including a second plurality of magnetic poles of alternating polarity equally spaced completely about the circumference of said inner surface, said first and second pluralities being of like number and providing at least eight sets of radially opposed poles of opposite polarity completely about said circumferentially continuous air gap to provide alternating magnetic fields emanating from said pole sets with their magnetic flux lines traversing said air gap in directions radially of said drive shaft, a thin temperature compensating element on one of said outer and inner cylindrical surfaces of said magnet element means, an eddy current rotary element of electrically conductive non-magnetic material mounted for rotation relative to said drive shaft, said eddy current element including a circumferentially continuous cylindrical wall coaxial with said drive shaft and projecting axially into said air gap between said outer and inner cylindrical surfaces of said magnet element means to circumferentially continuously intersect said alternating magnetic fields traversing said air gap, said annular magnet element means being of U-shaped cross section having concentric radially spaced cylindrical outer and inner leg portions, and means securing said leg portions to said drive shaft, said leg portions and said means securing said leg portions to said drive shaft being constituted by a molded body of a powdered permanent magnetic material bonded by a plastic binder, and said molded body including a unitary mounting member portion secured to the said drive shaft.

10. A measuring device as specified in claim 9, wherein said U-shaped cross section includes an annular web portion between said outer and inner leg portions, and a plurality of recesses opening through said web portion and equally spaced therearound at locations centrally between adjacent ones of said magnetic pole sets.

11. An eddy-current device for measuring the rotational speed of a rotating drive shaft comprising, annular permanent magnet element means concentric with and mounted on said shaft for rotation therewith, said element means being formed of low permeability magnet material and including radially spaced circumferentially continuous outer and inner cylindrical surfaces concentric with said shaft, said outer and inner surfaces providing a circumferentially continuous axially open air gap concentric with said shaft, said outer cylindrical surface including a first plurality of magnetic poles of alternating polarity equally spaced completely about the circumference of said outer surface, said inner cylindrical surface including a second plurality of magnetic poles of alternating polarity equally spaced completely about the circumference of said inner surface, said first and second pluralities being of like number and providing at least eight sets of radially opposed poles of opposite polarity completely about said circumferentially continuous air gap to provide alternating magnetic fields emanating from said pole sets with their magnetic flux lines traversing said air gap in directions radially of said drive shaft, a thin temperature compensating element on one of said outer and inner cylindrical surfaces of said magnet element means, and an eddy current rotary element of electrically conductive non-magnetic material mounted for rotation relative to said drive shaft, said eddy current element including a circumferentially continuous cylindrical wall coaxial with said drive shaft and projecting axially into said air gap between said outer and inner cylindrical surfaces of said magnet element means to circumferentially continuously intersect said alternating magnetic fields traversing said air gap, and said magnet element means being comprised of two permanent magnet ring members arranged concentrically one within the other and having radially opposed cylindrical surfaces defining said outer and inner cylindrical surfaces, said ring members being secured to said drive shaft by a mounting member having an annular portion of U-shaped cross section providing an annular mounting channel within which said ring members are received.

* * * * *

UNITED STATES PATENT AND TRADEMARK OFFICE
CERTIFICATE OF CORRECTION

PATENT NO. : 4,186,609

DATED : February 5, 1980

INVENTOR(S) : Max Baermann

It is certified that error appears in the above-identified patent and that said Letters Patent are hereby corrected as shown below:

Claim 2, column 6, lines 46-47, cancel "magnetic material in a plastic binder";

Claim 3, column 6, line 50, after "strontium" insert -- and lead --.

Signed and Sealed this

Tenth Day of June 1980

[SEAL]

Attest:

SIDNEY A. DIAMOND

Attesting Officer

Commissioner of Patents and Trademarks